Patented Jan. 15, 1929.

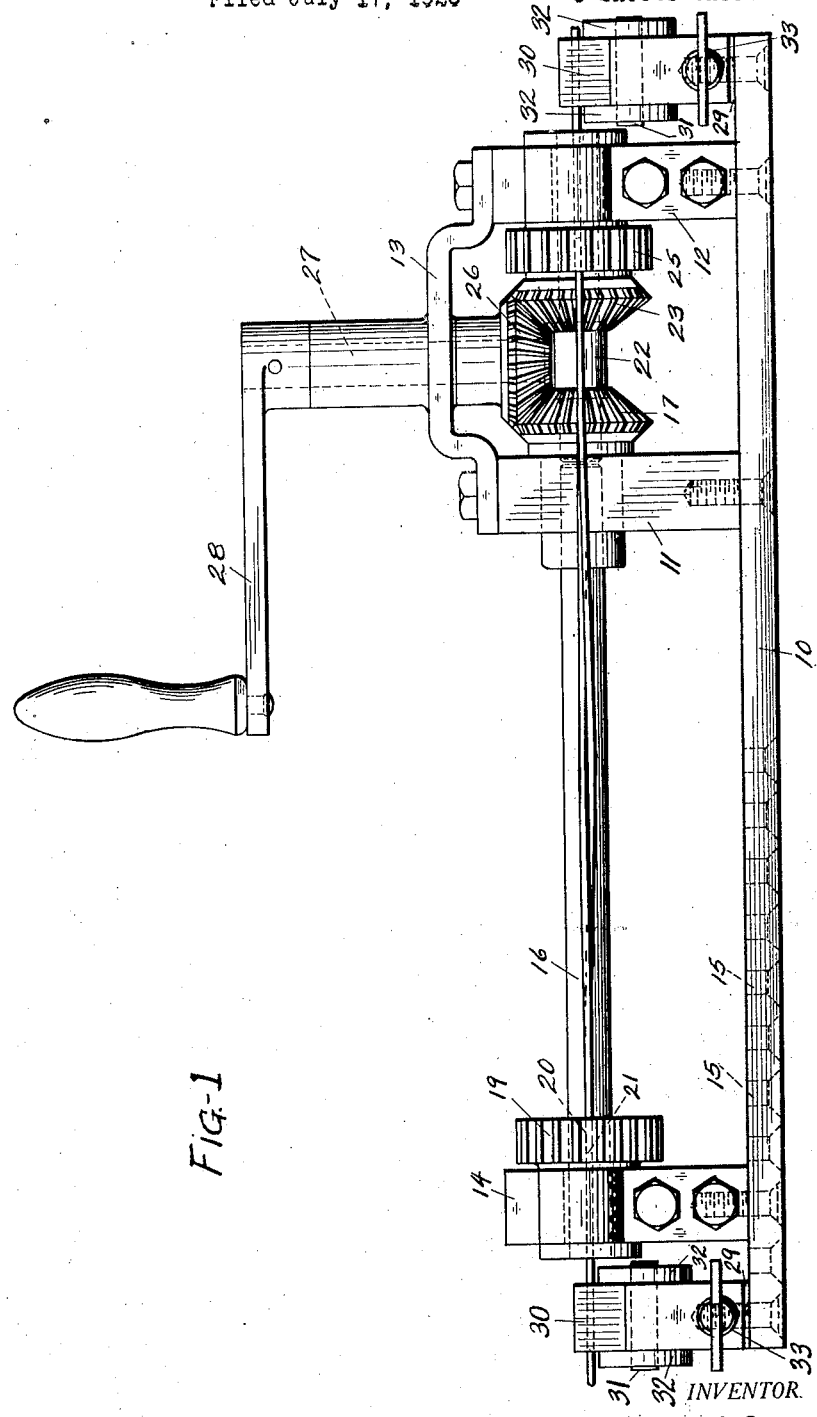

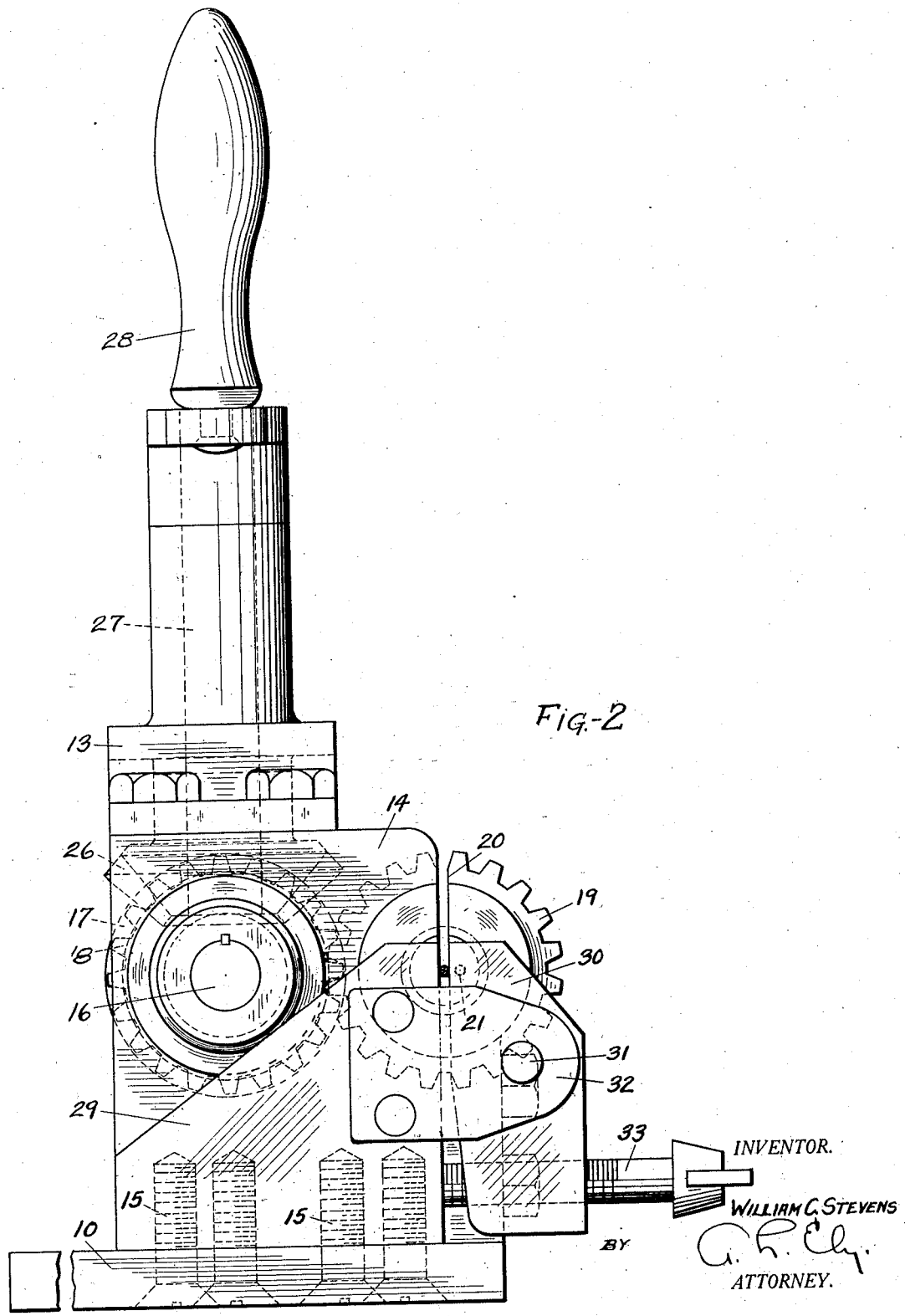

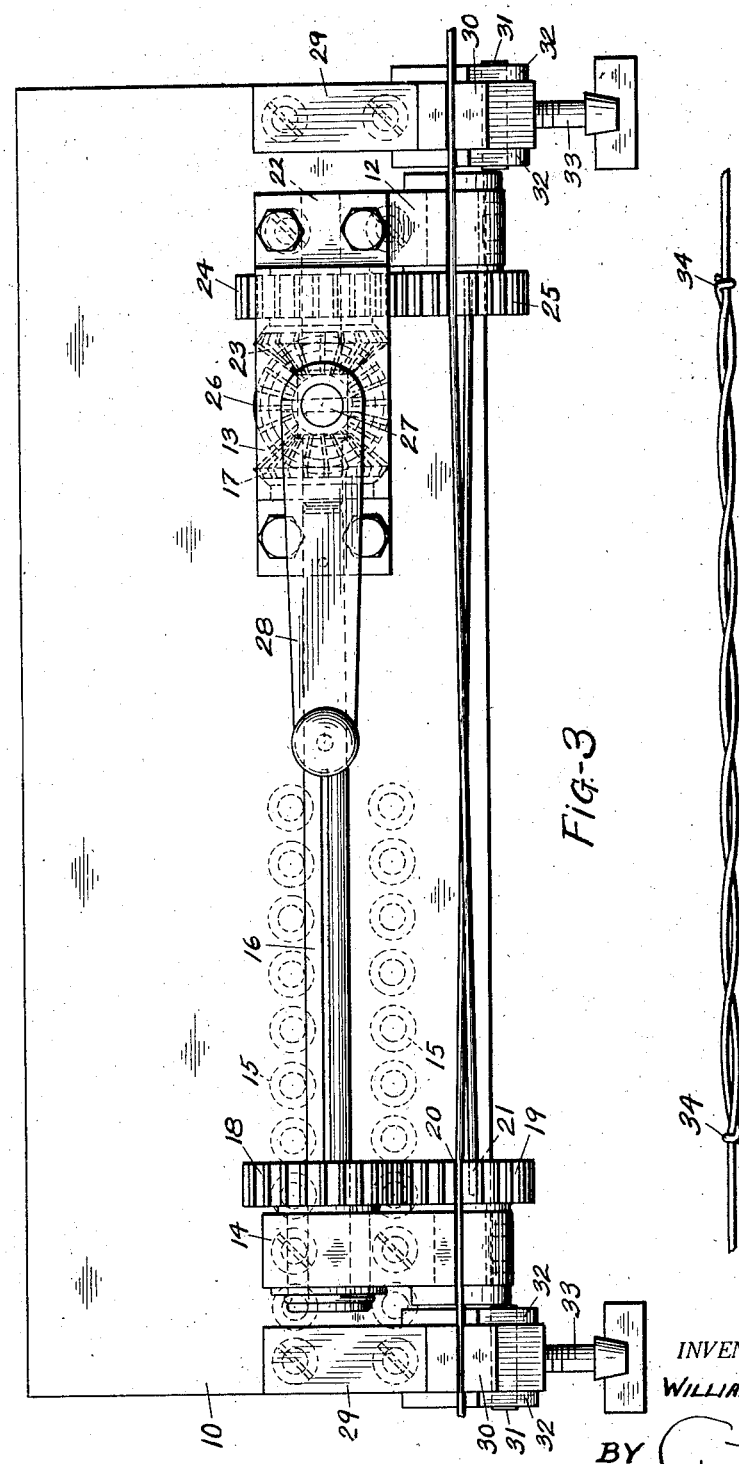

1,699,482

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

WIRE-TWISTING DEVICE.

Application filed July 17, 1925. Serial No. 44,356.

This invention relates to wire twisting devices such as are used for securing two ends of wire together.

The general object of the invention is to provide a simple, speedy and effective device for twisting two wire ends together and locking them in place.

The foregoing and other objects are obtained by the construction described below and illustrated in the accompanying drawings. It is to be understood that the invention is not limited to the specific construction shown and described.

Of the accompanying drawings:

Figure 1 is a side elevation of a device embodying the invention;

Figure 2 is an end elevation thereof;

Figure 3 is a plan thereof; and

Figure 4 is a view illustrating the completed work.

Referring to the drawings, 10 represents a base plate having secured on one end thereof a pair of spaced bearing brackets 11 and 12 spanned by a third bearing bracket 13 and having adjustably secured on the other end thereof a bearing bracket 14 adapted to be secured at various positions on plate 10 with respect to brackets 11 and 12, the plate 10 having a series of screw-receiving apertures 15, 15 formed therein for this purpose.

Journaled in brackets 11 and 14 is a shaft 16 having a bevel drive gear 17 thereon and having a spur gear 18 slidably keyed thereon and meshed with a spur gear 19 journaled on bracket 14. The gear 19 is formed with a radial slot 20 extending to the center thereof and an off-set aperture 21, the bearing therefor in bracket 14 being slotted as will be understood. Journaled in brackets 11 and 12 is a shaft 22 driven by a bevel gear 23 and having a spur gear 24 secured thereon in mesh with a spur gear 25 similar to gear 19. For driving gears 19 and 25 at the same speed in reverse directions a bevel gear 26 is arranged in mesh with gears 17 and 23 and is secured on a shaft 27 journaled in bracket 13 and adapted to be driven in any suitable manner as by a hand crank 28.

There are provided means at the opposite ends of plate 10 for clamping the wires to be joined in the device. Each means consists of a fixed jaw 29 secured on plate 10 and a movable jaw 30 pivoted as at 31 on a pair of brackets 32, 32 mounted on fixed jaw 29 and adapted to be moved toward and from jaw 29 a limited amount by means of a screw 33 threaded through the lower end thereof into engagement with fixed jaw 29.

In operation, the ends of the wires are passed between jaws 29 and 30 through slots 20 and an end of one wire is inserted in aperture 21 in gear 19 and of the other wire in aperture 21 of gear 25. Jaws 29 and 30 are then operated to clamp the wire securely. Crank 28 is now rotated, thus causing reverse rotation of gears 19 and 25, carrying the ends of the wires about each other to twist them together.

As the wires are taken up by the wrapping action, their ends gradually recede from apertures 21. This action is utilized to form locks, 34, 34 (Figure 4). Just as the ends leave the aperture 21, the rotating action of the gears and engagement of the wire ends with the faces thereof serve to snap them about the wire, to which each is secured, into the condition thereof as illustrated. The wires are thus securely spliced together.

It will appear from the foregoing that a simple but effective device has been provided for twisting wire ends and locking them securely together. Modifications of the invention may be resorted to without departing from the spirit thereof or the scope of the appended claims.

What I claim is:

1. Apparatus of the class described, comprising spaced gears, each having a radial slot and an off-set aperture thereon, said gears being relatively adjustable, other gears meshing with said first gear, means for reversely rotating the other gears, and means for fixedly clamping wires in said device with their ends free and respectively passing through a slot in one of said first gears and into an aperture of the other and vice versa.

2. Apparatus of the class described, comprising spaced, rotatable members, each adapted to have a wire end pass substantially through the center thereof and each provided with an eccentrically arranged aperture for receiving the end of a wire passing through the other, means for rotating said members at the same speed in reverse directions, and means for fixedly clamping the wire adjacent each member.

3. Apparatus of the class described, comprising spaced rotatable members relatively adjustable toward and from each other, each adapted to have a wire end pass substantially through the center thereof and each provided with an eccentrically arranged aperture for receiving the end of a wire passing through the other, and means for rotating said members at the same speed in reverse directions in any of their relative positions.

4. Apparatus of the class described, comprising spaced, rotatable members, relatively adjustable toward and from each other, each adapted to have a wire end pass substantially through the center thereof and each provided with an eccentrically arranged aperture for receiving the end of a wire passing through the other, and means for reversely rotating the members in any of their relative positions.

5. A wire splicing device comprising spaced twisting heads rotatable in fixed, spaced relationship, means for fixedly clamping the wires to be spliced adjacent the heads, and means for rotating the heads in reverse directions whereby the ends of the wires will withdraw from the heads as they are twisted together.

WILLIAM C. STEVENS.